United States Patent [19]

Saiki et al.

[11] 4,124,566

[45] Nov. 7, 1978

[54] PROCESS FOR PREPARING POLYESTERS

[75] Inventors: Noritsugu Saiki; Shizuka Kurisu; Shoji Kawase, all of Iwakuni, Japan

[73] Assignee: Teijin Limited, Osaka, Japan

[21] Appl. No.: 806,879

[22] Filed: Jun. 15, 1977

[30] Foreign Application Priority Data

Jun. 16, 1976 [JP] Japan .................................. 51-69717
Dec. 9, 1976 [JP] Japan ................................ 51-147082

[51] Int. Cl.$^2$ ...................... C08G 63/18; C08G 63/22; C08G 63/26; C08G 63/28

[52] U.S. Cl. .................................... 528/177; 528/279; 528/280; 528/281; 528/282; 528/283; 528/284; 528/285; 528/277; 528/276; 528/275; 528/180; 528/181; 528/193; 528/194; 528/273;

[58] Field of Search ................................ 260/47 C, 49

[56] References Cited

U.S. PATENT DOCUMENTS

| | | | |
|---|---|---|---|
| 3,399,170 | 8/1968 | Blaschke et al. | 260/47 |
| 3,413,379 | 11/1968 | Schade et al. | 260/47 |
| 3,560,439 | 2/1971 | Price et al. | 260/47 |
| 3,772,405 | 11/1973 | Hamb | 260/860 |

*Primary Examiner*—Lester L. Lee

*Attorney, Agent, or Firm*—Wenderoth, Lind & Ponack

[57] ABSTRACT

A process for preparing polyesters having superior thermal stability, transparency and chemical resistance, which comprises (1) a first step of esterifying (A) a difunctional carboxylic acid containing at least 60 mole% of an aromatic dicarboxylic acid, (B) 0 to 80 mole%, based on component (A), of an aliphatic diol and/or a dihydroxybenzene and (C) an aromatic monohydroxy compound in an amount of at least 210 mole% as a total of it and component (B) based on component (A), the esterification being performed until the degree of esterification reaches at least 80%, (2) subsequently, a second step of adding 0 to 80 mole%, based on component (A), of component (B) and a bisphenol (D) in an amount of 100 to 130 mole% as a total of it and component (B) based on component (A) to the reaction product obtained in the first step and reacting the mixture, the total amount of components (B) used in the first and second steps being 0 to 80 mole% based on component (C), and (3) performing at least the first of the above steps in the presence of an aromatic hydrocarbon medium having a boiling point of 105° to 175° C at normal atmospheric pressure and being inert at the reaction temperature.

20 Claims, No Drawings

PROCESS FOR PREPARING POLYESTERS

This invention relates to a process for preparing aromatic polyesters, and more specifically, to an improved process for preparing aromatic polyesters having superior thermal stability, transparency and chemical resistance.

Polyethylene terephthalate has gained widespread commercial acceptance because of its superior mechanical properties and chemical resistance, but possesses unsatisfactory dimensional stability and transparency because it has a relatively low heat distortion temperature and its rate of crystallization is fast.

In an attempt to remove these defects, methods have been suggested heretofore to polycondense aromatic dicarboxylic acid derivatives and aromatic dihydroxy compounds. These methods include, for example, (a) a method wherein an aromatic dicarboxylic acid chloride is reacted with an aromatic dihydroxy compound in solution, (b) a method wherein a diaryl ester of an aromatic dicarboxylic acid is melt-polymerized with an aromatic dihydroxy compound, and (c) a method comprising reacting an aromatic dicarboxylic acid, an aromatic dihydroxy compound and a diaryl carbonate.

The method (a) requires extra steps such as the removal of the reaction solvent and the purification of the product, and because of many production steps involved, it suffers from low productivity. The methods (b) and (c) are commercially disadvantageous since they require expensive materials such as the diaryl ester of aromatic dicarboxylic acid or the diaryl carbonate.

An improved process for producing polyesters was also suggested in Japanese Laid-Open patent publication No. 41094/76 corresponding to U.S. Ser. No. 619,495 which comprises reacting a difunctional carboxylic acid, especially an aromatic dicarboxylic acid with 2.1 to 10 moles, per mole of the difunctional carboxylic acid, of an aromatic monohydroxy compound at 230° to 350° C. and an absolute pressure of 1 to 15 kg/cm$^2$ until the conversion of the carboxyl groups of the difunctional carboxylic acid reaches at least 80%, and subsequently reacting the reaction product with 1 to 1.3 moles, per mole of the difunctional carboxylic acid, of a dihydroxy compound.

This process has the advantage that polyesters having superior thermal stability, dimensional stability, transparency and chemical resistance can be produced easily at low costs from aromatic dicarboxylic acids. However, it still suffers from defects. For example, the operability of the process is low because the reaction pressure should be controlled in the first step. Moreover, the polyesters obtained have undesirable coloration.

Accordingly, it is an object of this invention to provide a practical process which can overcome the difficulties of the prior art methods, and can easily afford polyesters using aromatic dicarboxylic acids and bisphenols.

Another object of this invention is to provide a process which can advantageously afford polyesters having superior thermal stability, transparency and chemical resistance.

Still another object of this invention is to provide a process for rapidly producing polyesters having superior color from aromatic dicarboxylic acids and bisphenols.

These objects can be achieved by a process for preparing polyesters in accordance with this invention which comprises (1) a first step of esterifying (A) a difunctional carboxylic acid containing at least 60 mole% of an aromatic dicarboxylic acid, (B) 0 to 80 mole%, based on component (A), of an aliphatic diol and/or a dihydroxybenzene and (C) an aromatic monohydroxy compound in an amount of at least 210 mole% as a total of it and component (B) based on component (A) until the degree of esterification reaches at least 80%; successively, (2) a second step of adding 0 to 80 mole%, based on component (A), of component (B) and a bisphenol (D) in an amount of 95 to 130 mole% as a total of it and component (B) based on component (A) to the reaction product obtained in the first step, and reacting the mixture, the total amount of components (B) used in the first and second steps being 0 to 80 mole% based on component (C); and (3) performing at least the first of the above steps in the presence of (E) an aromatic hydrocarbon medium which has a boiling point of 105° to 175° C. and is inert at the reaction temperature.

Examples of the aromatic dicarboxylic acid used as component (A) in the invention are terephthalic acid, isophthalic acid, ortho-phthalic acid, 2-methylterephthalic acid, 4-methylisophthalic acid, naphthalenedicarboxylic acids such as 1,4-, 2,6-, or 2,7-naphthalenedicarboxylic acid, diphenyldicarboxylic acids such as 4,4'-diphenyldicarboxylic acid, diphenyletherdicarboxylic acids such as 4,4'-diphenyletherdicarboxylic acid, diphenylsulfonedicarboxylic acids such as 4,4'-diphenylsulfonedicarboxylic acid, and diphenoxyethanedicarboxylic acid. They can be used either alone or in admixture of two or more. Of these, terephthalic acid, isophthalic acid, and naphthalenedicarboxylic acids are especially preferred. Component (A) may further contain a small proportion, usually, not more than 40 mole%, based on the entire acid component, of another difunctional carboxylic acid, for example, an aliphatic dicarboxylic acid such as adipic acid or sebacic acid, an alicyclic dicarboxylic acid such as hexahydroterephthalic acid or hexahydroisophthalic acid, and a hydroxycarboxylic acid such as ε-hydroxycaproic acid (ε-caprolactone), or hydroxybenzoic acid.

Examples of the aliphatic diols and/or dihydroxybenzene compounds used as component (B) in this invention include aliphatic diols such as ethylene glycol, propylene glycol, trimethylene glycol, tetramethylene glycol, neopentyl glycol or hexamethylene glycol; alicyclic-containing aliphatic diols such as cyclohexane dimethylol or tricyclodecane dimethylol; aliphatic diols containing an aromatic ring in the molecule such as bis(β-hydroxyethoxy) diphenylsulfone, 4,4'-bis(β-hydroxyethoxy) diphenyl ether, 1,2-bis(4-β-hydroxyethoxyphenyl) ethane, 2,2-bis(4-β-hydroxyethoxyphenyl) propane, 1,1-bis(4-β-hydroxyethoxyphenyl) cyclohexane or p-bis(β-hydroxyethoxy)benzene; and dihydroxybenzenes such as hydroquinone or resorcinol. These compounds can be used either alone or in admixture of two or more. Of these, ethylene glycol, neopentyl glycol, cyclohexane dimethylol and hydroquinone are especially preferred.

The aromatic monohydroxy compound used as component (C) in the present invention is a compound in which one hydroxyl group is directly bonded to an aromatic ring, and includes, for example, phenol, cresol, and naphthol. Of these, phenol is especially preferred.

The bisphenol used as component (D) in the present invention is a compound in which two hydroxyl groups are directly bonded to an aromatic ring, and includes, for example, 2,2-bis(4-hydroxyphenyl) propane [bisphenol A], 1,1-bis(4-hydroxyphenyl) cyclohexane [bisphenol Z], 1,1-bis(4-hydroxyphenyl) ethane, bis(4-hydroxyphenyl)methane, 1,2-bis(4-hydroxyphenyl)ethane, bis(4-hydroxyphenyl) cyclohexylmethane, 3,3-bis(4-hydroxyphenyl) pentane, and bis(4-hydroxyphenyl) ether. These compounds can be used either alone or in admixture of two or more. Of these, bisphenol A and bisphenol Z are especially preferred.

One embodiment of this invention is that in the first step, the aromatic dicarboxylic acid as component (A), the aliphatic diol as component (B) and the aromatic monohydroxy compound as component (C) are reacted, and in the subsequent second step, the aromatic dihydroxy compound as component (D) is reacted with the reaction product of the first step.

According to another embodiment of this invention, the component (B) can be used either in the second step or both in the first and second steps, and according to still another embodiment, the use of component (B) can be omitted.

The polyester-forming reaction in the second step subsequent to the esterification reaction in the first step proceeds without any trouble, and it is particularly noteworthy that the presence of phenol does not adversely affect the reaction of the second step.

The performance of the second-step reaction subsequent to the first-step reaction means that the reaction product in the first step is fed for the reaction of the second step. Accordingly, it is within the scope of the present invention to store the molten reaction product of the first step temporarily (usually within 2 hours) and then feed it for the reaction of the second step.

The presence of the aliphatic diol or dihydroxybenzene promotes the reactions, especially the esterification reaction in the first step.

When component (B) is used in the first step, its amount is not more than 80 mole%, preferably 5 to 80 mole%, more preferably 10 to 75 mole%, especially preferably 20 to 65 mole%, based on component (A). When component (B) is used in the second step, its amount is the same as in the first step. When component (B) is used both in the first and second steps, the total amount of components (B) used in these steps should be adjusted to the above range.

When the amount of component (B) is larger than 80 mole%, the resulting polymer has poor thermal stability.

The amount of the aromatic monohydroxy compound (C) is such that the total amount of it and the component (B) is at least 210 mole% based on the difunctional carboxylic acid (A). When the amount is less than 210 mole%, the rate of the reaction is slow. The amount is preferably at least 230 mole%, more preferably at least 250 mole%. The upper limit is about 1000 mole%.

The amount of the component (D) is 100 to 130 mole%, preferably 100 to 120 mole%, based on the difunctional carboxylic acid (A). When it is less than 100 mole% or more than 130 mole%, the rate of polymerization becomes slow.

In the first step of the process of this invention, the components (A), (B) and (C) or the components (A) and (C) are reacted until at least 80%, preferably 85 to 98%, of the carboxyl groups of component (A) react. Preferably, the reaction is carried out at a temperature of 200° to 350° C. (more preferably 230° to 320° C.) and a pressure of 1 to 15 Kg/cm$^2$ (absolute). Specific procedures available will become apparent from Examples to be given hereinbelow.

Preferably, a catalyst is used in the first-step reaction. Examples of the catalyst are elemental metals such as sodium, potassium, lithium, calcium, magnesium, barium, tin, strontium, zinc, iron, aluminum, cobalt, lead, nickel, titanium, magnesium, antimony or arsenic, and compounds of these metals such as their oxides, hydrides, hydroxides, halides, inorganic acid salts, organic acid salts, complex salts, double sats, alcoholates, or phenolates. Of these, titanium compounds such as titanium tetrabutoxide, titanium oxalate or titanium oxide, tin compounds such as dibutyltin oxide, antimony compounds such as antimony trioxide, and lead compounds such as lead oxide are preferred. The amount of the catalyst is usually 0.001 to 5 mole% based on component (A).

The reaction in the first step is carried out until at least 80% of the carboxyl groups of component (A) react. When the conversion of the carboxyl groups is less than 80%, the reaction of the reaction product with component (D) to be added does not fully proceed, and polyesters having the desired properties cannot be obtained. The preferred conversion of the carboxyl groups (the degree of esterification) is at least 85%, more preferably at least 90%.

The degree of esterification can be determined by the carboxyl groups in the reaction product. For example, the esterification reaction is carried out until the carboxyl group value per $10^6$ g of the reaction product becomes not more than 1,000, preferably not more than 750, more preferably not more than 500. When the carboxyl value exceeds 1,000, the reaction of the first-step reaction product with the bisphenol added subsequently does not proceed sufficiently and a polyester having the desired high degree of polymerization cannot be obtained.

Following the first step, component (D) or both components (D) and (B) are added to the reaction product of the first step, and the mixture is polycondensed (second step). Preferably, the amount of component (D) is at least 50 mole% based on the total diol component in the resulting polyester. It is preferred that the polycondensation reaction is carried out at a temperature of 200° to 400° C. and a pressure of 760 to 0.001 mmHg.

In the present invention, the reaction of the first step may be carried out in the presence of an aromatic hydrocarbon medium as component (E). This accelerates the rate of reaction, and serves to produce aromatic polyesters free from undesirable coloration with good operability. The medium (E) is a compound at least part of which is present in the liquid state under the reaction conditions. It is an aromatic hydrocarbon which has a boiling point of 105° to 175° C. under atmospheric pressure, does not substantially dissolve water, and is inert at the reaction temperature. Preferably, the hydrocarbon medium (E) does not contain a reactive unsaturated bond. Examples of preferred aromatic hydrocarbons are lower alkyl-substituted benzenes such as toluene, xylene, ethylbenzene, cumene, cymene, trimethylbenzene, and ethyltoluene. Of these, ethylbenzene is especially preferred. The use of an aromatic hydrocarbon medium having a boiling point of less than 105° C. increases the reaction pressure. Or it distills faster than water, or has only a small effect of increasing the rate of the reaction. On the other hand, hydrocarbon media having a boiling point of more than 175° C. only act as diluents, and rather retard the rate of reaction or color the polymers.

The amount of the aromatic hydrocarbon (E) is 0.1 to 10 times, preferably 0.3 to 5 times, more preferably 0.5 to 3 times, the weight of the dicarboxylic acid (A). If the amount of the aromatic hydrocarbon is too small, it has only a small effect of promoting the esterification reaction. If it is too large, the reaction apparatus must be increased in size, and moreover, the rate of the reaction is decreased.

Preferably, the aromatic dicarboxylic acid aryl ester (F) is used jointly with the hydrocarbon medium (E). The use of compound (F) can reduce the reaction pressure.

Preferably, the aromatic dicarboxylic acid aryl ester is thermally stable at the reaction temperature. Examples of component (F) include esters formed between dicarboxylic acids such as terephthalic acid, isophthalic acid 2,6-naphthalenedicarboxylic acid or 4,4'-diphenylcarboxylic acid and aromatic monohydroxy compounds of the types exemplified hereinabove. In view of the ease of the reaction and post-treatment, it is preferred that the acid component of the aryl dicarboxylate be the same as the dicarboxylic acid used as component (A). It is preferred to use a product of the esterification reaction between an aromatic dicarboxylic acid and an aromatic monohydroxy compound as the aromatic dicarboxylic acid aryl ester (F). It is especially preferred to use a part of the esterification reaction product in the first step between the aromatic dicarboxylic acid and the aromatic monohydroxy compound as component (F). When a part of the esterification reaction product of the first step is used, it sometimes contains an ester formed between the aromatic dicarboxylic acid and the aliphatic diol or dihydroxybenzene in addition to the ester formed between the aromatic dicarboxylic acid and the aromatic monohydroxy compound. This ester mixture can also be used as the aromatic dicarboxylic acid aryl ester (F).

The amount of the aromatic dicarboxylic acid aryl ester (F) may be any which can render the dicarboxylic acid (A) flowable in the slurry state. Usually, its amount is 0.2 to 4 moles, preferably 0.5 to 3 moles, per mole of component (A). If the amount is too small, the flowability of the aromatic dicarboxylic acid is lost, and the reaction time increases. Moreover, the reaction pressure is not sufficiently decreased. On the other hand, if the amount is too large, the amount of a polyester produced from a reactor of a given capacity decreases, and the efficiency of the manufacturing apparatus decreases.

The aromatic hydrocarbon medium (E) or the aromatic dicarboxylic acid aryl ester (F) can be added at any desired stage before the starting aromatic dicarboxylic acid has reacted to an extent of 20%. It is preferred to add it to the reaction system before or at the initiation of the esterification reaction. Most commonly, the component (E) or (F) is added all at a time at the beginning of the reaction. The aromatic dicarboxylic acid aryl ester (F) can be supplied by leaving a part of the aromatic dicarboxylic acid aryl ester produced in the previous batch.

The esterification reaction in the present invention is carried out by charging components (A), (B), (C), (E) and (F) into a pressure reactor equipped with a rectifying column or a fractionating column, and distilling off water formed by the reaction from the top of the rectifying column or fractionating column. The distillate consists of water, the aromatic hydrocarbon medium (E) and the aromatic monohydroxy compound (C) present in the reactor together. The water in the form of liquid is removed from the distillate, and the remaining aromatic hydrocarbon medium (E) and the aromatic monohydroxy compound (C) are refluxed to the reaction zone. This fluxing further enhances the rate of reaction, and further improves the color of the polyester. The refluxing can be performed by returning a mixture of the aromatic hydrocarbon medium and the aromatic monohydroxy compound in the liquid state to the reaction zone, especially to the aromatic dicarboxylic acid slurry, or blowing the mixture in the gaseous state into the aromatic dicarboxylic acid slurry. It is preferred that the unreacted aromatic dicarboxylic acid (A) be placed in an atmosphere of the aromatic monohydroxy compound in a higher concentration. The mole ratio of the aromatic monohydroxy compound to the aromatic hydrocarbon medium in the mixture to be refluxed is usually 20:1 to 1:1. Since the aromatic monohydroxy compound is hydrophilic and the degree of hydrophilicity increases with increasing temperature, it is preferred to separate it from water at as low a temperature as possible. The joint presence of the aromatic hydrocarbon promotes the distillation of by-product water, and reduces the concentration of the aromatic monohydroxy compound in the distillate. Furthermore, this makes it easy to separate the aromatic monohydroxy compound from water.

In order to prescribe the most preferred state of the esterification reaction, the reaction temperature should be raised above the boiling point of the aromatic monohydroxy compound. In this case, the aromatic monohydroxy compound is present only in a low concentration in the aromatic dicarboxylic acid slurry, and the remainder of it is present in the gaseous state in the reaction system, thus increasing the reaction pressure. Hence, the amount of the aromatic hydrocarbon should be determined according to the reaction pressure, the rate of the reaction, the proportion of the aromatic monohydroxy compound in the mixture, the separation of the diaryl ester, etc.

If the esterification reaction product in the first-step in the previous batch is used as the aromatic dicarboxylic acid aryl ester (F) in the production of polyester in the second and subsequent batches and if the reaction product is a mixed ester of the aromatic monohydroxy compound and the aliphatic diol or dihydroxybenzene and the aromatic dicarboxylic acid, it is preferred to bring the proportions of the components (A) and (B) charge into agreement with the molar amounts of the dicarboxylic acid component and the aliphatic diol component or dihydroxybenzene contained in the esterification reaction product. If the operation is performed in this way, the composition of the reaction system in the esterification stage becomes constant in every batch, and the polymerization of the esterification product can be stably and continuously carried out in the subsequent step.

After esterifying components (A) and (C) and optionally also with component (B), the excess of component (C) and/or (E) is removed from the esterification reaction product, and then the product is submitted to the second-step reaction. The second-step reaction is carried out after adding the bisphenol (D) to the first-step reaction product.

The second-step reaction is performed generally by adding the bisphenol (D) to the whole or a part of the first-step reaction step before or after removing the excess of the aromatic monohydroxy compound (C) and/or the aromatic hydrocarbon medium (E), subjecting the mixture to ester-interchange reaction, distilling off the by-product aromatic monohydroxy compound, and then polycondensing the ester-interchange reaction product while removing volatile substances under reduced pressure. When a part of the first-step reaction product is left in the first-step reactor in order to use it for the first-step reaction in the next batch, and the remainder is used for the second-step reaction, it is preferred to use the first-step reaction product in an amount corresponding to the amount of the aromatic dicarboxylic acid (A) freshly charged into the reactor. The preferred reaction temperature in the second step is 240° to 400° C., especially 260° to 370° C., and the preferred reaction pressure is 760 to 0.001 mmHg. The reaction is usually performed in the molten state. But when the resulting polymer has a high melting point, solid-phase polymerization may also be preferably used.

The resulting aromatic polyester preferably has a reduced specific viscosity of at least 0.5.

When the polymer used by the reaction in the molten state is further polymerized in the solid phase to form a polymer of a higher degree of polymerization, the solid phase polymerization reaction proceeds stably without involving the agglomeration of the polymer mass during the reaction. Preferably, the polymer obtained by the melt polymerization is crystallized thoroughly. However if the reaction product has already solidified (crystallized) in the melt polymerization step, it can be submitted to the solid phase polymerization as such. One method for crystallizing the molten reaction product is to heat-treat it. Another method is to treat the reaction product with a crystallizing solvent, for example, ketones such as acetone, methyl ethyl ketone, methyl isobutyl ketone and acetophenone, esters such as ethyl acetate, aromatic hydrocarbons such as benzene, toluene and xylene, ethers such as ether, tetrahydrofuran and dioxane, and amines such as dimethylformamide.

Preferred conditions for performing the solid phase polymerization of the molten reaction product are as follows:

Form of polymer: powder, chips

Temperature: 200° C.-320° C., preferably 230°-300° C., and more preferably 240° to 280° C.

Atmosphere: under a stream of an inert gas such as nitrogen gas or under reduced pressure.

The solid phase polymerization reaction is best carried out until the reduced specific viscosity of the product becomes at least 0.5, preferably at least 0.6. While the reaction time will vary depending upon such factors as the form of the polymer and the reaction temperature, the desired high degrees of polymerization can be obtained by maintaining the product of the melt polymerization under the above-mentioned conditions for at least 30 minutes.

In the process of this invention, additives such as catalysts, stabilizers or coloring agents generally used in the preparation of polyesters can be employed.

The process of this invention makes it possible to afford polyesters having a high degree of polymerization, high thermal stability, and superior dimensional stability, transparency, chemical resistance and color rapidly and easily at low cost from aromatic dicarboxylic acids as a starting material.

The process of the invention also has the advantage that the reaction pressure is low, the operation of the reaction is easy, and the rate of the reaction is fast.

The invention is illustrated in greater detail by the following Examples and Comparative Example.

In these examples, all parts are by weight. The various properties in these examples were measured by the following methods.

Reduced specific viscosity ($\eta_{sp/c}$)

Measured at 35° C. using a mixed solvent consisting of phenol and tetrachloroethane in a weight ratio of 60:40 while maintaining the concentration (C) at 1.2 g/deciliter.

Carboxyl number

Measured in accordance with the Conix's method (Macro. Molecular. Chem., 26, 226, 1958).

Heat distortion temperature

Measured in accordance with ASTM D-648.

Degree of esterification in the first step

Calculated in accordance with the following equation.

$$\text{Degree of esterification} = \frac{10^6 - (M_B - 2M_C) \cdot B + M_A \cdot (\tfrac{1}{2}) \cdot CV}{10^6 + (M_C - 18) \cdot CV} \times 100$$

wherein $M_A$, $M_B$ and $M_C$ are the molecular weights of components (A), (B) and (C) respectively (when any one of these components is a mixture of two or more compounds, its molecular weight is an average of the molecular weights of these components), B is the molar ratio of component (B) to component (A) at the time of feeding the starting components, and CV is the carboxyl value of the reaction product measured after removing the excess of component (C) from it.

Color

The *b* value showing the color of a polyester is measured by a CM-20 type color differential meter of Color Machine Company. Larger *b* values show stronger yellowishness.

EXAMPLE 1

An autoclave equipped with a rectifying column and a stirrer was charged with 83.0 parts of terephthalic acid, 83.0 parts of isophthalic acid, 376 parts of phenol, 50 parts of ethylbenzene and 0.12 part of stannous acetate, and purged with nitrogen.

The inside pressure of the autoclave was heated. The temperature of the inside of the autoclave was maintained at 280° C., and by-product water and ethylbenzene were distilled. The upper layer (ethylbenzene layer) of the distillate was recycled to the top of the rectifying column. The amount of the lower layer of the distillate became 31 parts after a lapse of 280 minutes. During this period, the pressure spontaneously changed from 10 kg/cm$^2$ to 8 kg/cm$^2$. A part of the product was dried overnight at 120° C. under reduced pressure, washed with water, and again dried. Its carboxyl value was then measured, and found to be 620 eq/10$^6$g (the degree of esterification 89%).

The product was transferred to a reactor equipped with a stirrer, and 239.4 parts of bisphenol A was added. The mixture was reacted for 60 minutes at 280° C. under atmospheric pressure. Then, the pressure of the reaction system was reduced gradually, and in 30 minutes, reached about 0.5 mmHg (absolute). At this pressure, the reaction was further carried out for 150 minutes. The polymer obtained was transparent and had a reduced specific viscosity of 0.83.

The polymer was dried, and injection-molded at 290° C. to form an article with a thickness of 2 mm. The *b* value of the molded article was 11.

COMPARATIVE EXAMPLE 1

An autoclave equipped with a rectifying column and a stirrer was charged with 83.0 parts of terephthalic acid, 83.0 parts of isophthalic acid, 376 parts of phenol, and 0.12 part of tin acetate, and purged with nitrogen. Then, the autoclave was heated to 280° C. while adjusting the nitrogen pressure so that the absolute pressure of the inside of the reaction system became 6.5 kg/cm$^2$. In 20 minutes, the distillation of water began. The reaction was further performed for 310 minutes while gradually reducing the absolute pressure of the reaction system to 5.0 kg/cm$^2$. During this period, about 31 parts of water distilled. A part of the reaction product was taken, washed with water, and then examined for its carboxyl value. It was found that the carboxyl value of the product was 628 eq/10$^6$ g (the degree of esterification 89%).

The product was then transferred to a reactor equipped with a stirrer, and 239.4 parts of bisphenol A was added. They were reacted at 280° C. under atmospheric pressure for 60 minutes. Then, the pressure of the reaction system was gradually reduced until it reached about 0.5 mmHg (absolute pressure) in 30 minutes. At this pressure, the reaction was performed for an additional 150 minutes. The polymer obtained was transparent and had a reduced specific viscosity of 0.80. The polymer was dried, and injection-molded at 290° C. The *b* value of the molded article was 21.

EXAMPLE 2

An autoclave equipped with a rectifying column and a stirrer was charged with 133 parts of terephthalic acid, 33 parts of isophthalic acid, 56.4 parts of phenol, 50.9 parts of diphenyl terephthalate, 12.7 parts of diphenyl isophthalate, 5.0 parts of ethylbenzene, and 0.036 part of stannous acetate, and purged with nitrogen. The pressure inside the autoclave was returned to normal atmospheric pressure, and the autoclave was heated. While maintaining the inside temperature of the autoclave at 290° C., the by-product water and other fractions were let out from the top of the rectifying column. Water was separated from the distillate, and the other fractions were refluxed to the slurry in the reaction system by means of a metering pump at a rate of 0.8 part per minute. When the reaction was performed for 2 hours, the pressure of the reaction system became 3.8 kg/cm$^2$.G and a reaction product having a carboxyl value of 990 eq/10$^6$ was obtained. When the reaction was performed for 3 hours, the reaction pressure became 3.3 kg/cm$^2$.G, and a reaction product having a carboxyl value of 18 eq/10$^6$g.

After the 3-hour reaction, a part of the reaction mixture was transferred to an evacuable polycondensation reaction apparatus. The amount of the reaction mixture transferred was 30.9 parts, and it contained 16.5 parts of diphenyl terephthalate and 3.9 parts of diphenyl isophthalate. Bisphenol A (14.6 parts) was added to the reaction mixture. They were reacted for 1 hour at 280° C. under atmospheric pressure. Then, the degree of vacuum in the apparatus was adjusted to 0.5 mmHg over a period of 30 minutes, and the reaction temperature was adjusted to 340° C. The reaction mixture was maintained at this condition for 2 hours, and then, the polymer was discharged. The polymer discharged had a reduced specific viscosity of 0.85, and a color expressed by an L value of 44.8, an *a* value of +7.4, and a *b* value of +26.7.

EXAMPLE 3

By the same procedure as in Example 2 except that the fractions from the rectifying column other than water were refluxed without using a metering pump, the reaction was performed. When the reaction was performed for 6 hours, the reaction pressure became 3.8 kg/cm$^2$.G, and the reaction product had a carboxyl value of 750 eq/10$^6$g. When the reaction was further carried out for 1 hour, the reaction pressure became 3.4 kg/cm$^2$.G, and the reaction product had a carboxyl value of 44 eq/10$^6$g.

When the reaction was carried out for a total period of 7 hours, a part of the reaction mixture was transferred to a polycondensation apparatus. The amount of the reaction mixture transferred was 32.5 parts, and it contained 16.0 parts of diphenyl terephthalate and 4.0 parts of diphenyl isophthalate. Bisphenol A (15.0 parts) was added to the reaction mixture, and they were polycondensed in the same way as in Example 1 to afford a polymer having a reduced specific viscosity of 0.84, and a color expressed by an L value of 19.7, an *a* value of 11.1, and a *b* value of 5.7.

EXAMPLE 4

An autoclave equipped with a rectifying column and a stirrer was charged with 133 parts of terephthalic acid, 33 parts of isophthalic acid, 564 parts of phenol, 0.036 part of tin acetate and 5 parts of each of the various media shown in Table 1 (with or without further addition of 50.9 parts of diphenyl terephthalate and 12.7 parts of diphenyl isophthalate as shown in Table 1), and the inside of the autoclave was purged with nitrogen. The autoclave was heated at atmospheric pressure until the temperature of its inside reached 290° C. At this temperature, the by-product was and other fractions were distilled out from the top of the rectifying column. The water was separated from the distillate, and all the other fractions were forcedly refluxed to the slurry in the reaction system by means of a pump.

All the resulting product was transferred to a stirred reaction vessel which could be used to perform a high vacuum reaction, and 282 parts of bisphenol A was fed into the reaction vessel. The inside of the reaction vessel was purged with nitrogen, and the mixture was reacted at 280° C. for 1 hour at atmospheric pressure. The medium and the excess of the phenol were distilled off, and in the course of 30 minutes, the degree of vacuum inside the reactor was adjusted to 0.5 mmHg. The reaction was continued for an additional 30 minutes. The pressure of the inside of the reactor was increased by introducing nitrogen, and the polymer was discharged.

The polymer was cut into cylindrical chips with a diameter of about 2 mm and a length of about 3 mm.

The chips were dipped in acetone at room temperature for about 1 hour, dried in a vacuum dryer at 140° C. for 2 hours, and charged into a tumbler-type solid-polymerization apparatus. The solid phase polymerization was carried out at 290° C. under a reduced pressure of about 0.5 mmHg.

The results obtained are shown in Table 1.

Table 1

| Medium | Addition of diphenyl terephthalate and diphenyl isophthalate | Reaction time (hours) | Initial reaction pressure (Kg/cm².G) | Final reaction pressure (Kg/cm².G) | Carboxyl value (eq/10⁶g) | $\eta_{sp/c}$ of the polymer obtained by solid-phase polymerization | Color (b value) |
|---|---|---|---|---|---|---|---|
| Toluene | Yes | 4 | 13.5 | 6.2 | 27 | 0.95 | 25.7 |
| Xylene | Yes | 3 | 4.4 | 3.3 | 21 | 0.98 | 23.4 |
| | No | 3.5 | 9.1 | 3.9 | 25 | 1.02 | 25.8 |
| Pseudo- | Yes | 3 | 4.2 | 3.2 | 18 | 1.02 | 24.3 |
| cumene | No | 3.5 | 8.5 | 3.7 | 22 | 1.07 | 26.4 |
| Ethyl- | Yes | 3 | 4.5 | 3.4 | 20 | 1.12 | 19.8 |
| benzene | No | 3.5 | 9.0 | 4.1 | 25 | 1.08 | 22.6 |

EXAMPLE 5

Example 4 was repeated except that 166 parts of terephthalic acid alone was used instead of the terephthalic acid and isophthalic acid, 63.6 parts of diphenyl terephthalate was used instead of the diphenyl terephthalate and diphenyl isophthalate, and ethylbenzene was used as the medium.

Three hours after the initiation of the reaction, the reaction pressure decreased to 3.6 $kg/cm^2$.G, when the reaction was terminated. Then, the medium and the excess of phenol were removed, and the acid value of the reaction product was measured and found to be 52 $eq/10^6g$. The product was charged into a vacuum reaction vessel together with 282 parts of bisphenol A, and the mixture was reacted at 280° C. for 60 minutes. In the course of 30 minutes, the pressure of the inside of the reactor was reduced to 0.5 mmHg, whereupon the product solidified inside the reactor. It was withdrawn, and pulverized to a size of 5 to 20 mesh. The pulverized particles were charged into a solid phase polymerization apparatus, and reacted at 290° C. and about 0.5 mmHg for 6 hours. The resulting polymer had a reduced specific viscosity $[\eta_{sp/c}]$, as measured at 35° C. in a phenol/tetrachloroethane (6/4) solution of the polymer (concentration 1.2 g/100 ml), of 0.85.

EXAMPLE 6

Example 4 was repeated except that 173 parts of 2,6-naphthalenedicarboxylic acid and 59.2 parts of diphenyl-2,6-naphthalenedicarboxylate were used instead of the terephthalic acid and diphenyl terephthalate, and ethylbenzene was used as the medium. The reaction pressure finally reached 3.2 $kg/cm^2$.G, and the reaction product was withdrawn. The medium and the excess of phenol were removed. The resulting product had an acid value of 45 $eq/10^6g$.

It was melt-polymerized and polymerized in the solid phase in the same way as in Example 4. The resulting polymer had a reduced specific viscosity $[\eta_{sp/c}]$, as determined at 35° C. in a phenol/tetrachloroethane (6/4) solution of the polymer in a concentration of 1.2 g/100 ml., of 0.83.

What we claim is:

1. A process for preparing polyesters, which comprises (1) a first step of esterifying at a temperature of 200°-350° C. and a pressure of 1 to 15 $kg/cm^2$, (A) a difunctional carboxylic acid containing at least 60 mole% of an aromatic dicarboxylic acid, (B) 0 to 80 mole%, based on component (A), of a material selected from the group consisting of an aliphatic diol, a dihydroxybenzene or mixtures thereof and (C) an aromatic monohydroxy compound in an amount of at least 210 mole% as a total of it and component (B) based on component (A), the esterification being performed until the degree of esterification reaches at least 80%, (2) subsequently, a second step of adding 0 to 80 mole%, based on component (A), of component (B) and a bis-phenol (D) in an amount of 100 to 130 mole% as a total of it and component (B) based on component (A) to the reaction product obtained in the first step and reacting the mixture at a temperature of 200° to 400° C. and at a pressure of 760–0.001mHg, the total amount of components (B) used in the first and second steps being 0 to 80 mole% based on component (C), and (3) performing at least the first of the above steps in the presence of an aromatic hydrocarbon medium having a boiling point of 105° to 175° C. at normal atmospheric pressure and being inert at the reaction temperature.

2. The process of claim 1 wherein component (B) is added only in the first step in an amount of 5 to 80 mole% based on component (A).

3. The process of claim 1 wherein at least the first of the two reaction steps is performed in the presence of the aromatic hydrocarbon medium (E) and an aryl ester (F) of an aromatic dicarboxylic acid.

4. The process of claim 1 wherein the aromatic hydrocarbon medium (E) is added at the beginning of the esterification reaction in the first step.

5. The process of claim 1 wherein component (A) is selected from the group consisting of terephthalic acid, isophthalic acid and 2,6-naphthalenedicarboxylic acid.

6. The process of claim 1 wherein component (B) is selected from the group consisting of ethylene glycol, neopentyl glycol and cyclohexane dimethylol.

7. The process of claim 1 wherein component (C) is phenol.

8. The process of claim 1 wherein component (D) is selected from the group consisting of 2,2-bis(4-hydroxyphenyl)propane and 1,1-bis(4-hydroxyphenyl)cyclohexane.

9. The process of claim 1 wherein the amount of the aromatic dicarboxylic acid aryl ester (F) is 0.2 to 4 moles per mole of the aromatic dicarboxylic acid (A).

10. The process of claim 3 wherein the aromatic dicarboxylic acid aryl ester (F) is added at the beginning of the esterification reaction in the first step.

11. The process of claim 1 wherein at least in the first step, the reaction is carried out under conditions which cause the refluxing of the aromatic hydrocarbon medium (E), and the aromatic hydrocarbon medium (E) or a mixture of the aromatic hydrocarbon medium (E) and the aromatic monohydroxy compound (C) is refluxed in the liquid state to the reaction zone.

12. The process of claim 1 wherein the aromatic hydrocarbon medium (E) is at least one alkyl-substituted benzene selected from the group consisting of toluene, xylene, ethylbenzene, cumene, cymene, trimethylbenzene and ethyltoluene.

13. The process of claim 3 wherein the aromatic dicarboxylic acid aryl ester (F) is an ester formed between an aromatic dicarboxylic acid selected from the group consisting of terephthalic acid, isophthalic acid and 2,6-naphthalenedicarboxylic acid, and an aromatic monohydroxy compound.

14. The process of claim 1 wherein at least in the first step, the reaction is carried out under conditions which cause the refluxing of the aromatic hydrocarbon medium (E), and the aromatic hydrocarbon medium (E) and water generated by the reaction, or a mixture of these with the aromatic monohydroxy compound (C) is condensed outside the reaction zone to separate it into an aqueous layer and an organic layer, after which the organic layer is refluxed to the reaction zone.

15. The process of claim 1, wherein the second step reaction is carried out in the molten state.

16. The process of claim 1, wherein the second step reaction is carried out first in the molten state, and then in the solid phase at a temperature of 200°-320° C., in the presence of an inert gas or under reduced pressure.

17. The process of claim 1, wherein the reaction is carried out in the presence of a catalyst.

18. The process according to claim 17, wherein the catalyst is selected from the group consisting of the elemental metals of sodium, potassium, lithium, calcium, magnesium, barium, tin, strontium, zinc, iron, aluminum, cobalt, lead, nickel, titanium, manganese, antimony or arsenic or compounds of said metals selected from the group consisting of oxides, hydrides, hydroxides, halides, inorganic acid salts, organic acid salts, complex salts, double salts, alcoholates, or phenolates of said metals.

19. A process according to claim 18, wherein the catalyst is used in an amount of 0.001 to 5 mole% based on component (A).

20. A polyester produced by the process of claim 1 having excellent thermal stability, transparency and chemical resistance.

* * * * *